US008042753B2

(12) United States Patent
Yamaguchi et al.

(10) Patent No.: US 8,042,753 B2
(45) Date of Patent: Oct. 25, 2011

(54) MOBILE CRUSHER

(75) Inventors: Masaho Yamaguchi, Kyotanabe (JP); Yasutaka Nishida, Hirakata (JP); Mitsunobu Yamada, Hirakata (JP); Tooru Nakayama, Hirakata (JP); Ryouichi Togashi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 174 days.

(21) Appl. No.: 12/464,247

(22) Filed: May 12, 2009

(65) Prior Publication Data

US 2009/0302141 A1 Dec. 10, 2009

(30) Foreign Application Priority Data

May 14, 2008 (JP) ................................ 2008-127048
Mar. 27, 2009 (JP) ................................ 2009-078911

(51) Int. Cl.

*A01D 34/00* (2006.01)
*B02B 5/02* (2006.01)
*B02C 9/04* (2006.01)
*B02C 19/00* (2006.01)
*B03B 7/00* (2006.01)

(52) U.S. Cl. .................... 241/101.74; 241/264; 241/265

(58) Field of Classification Search ............. 241/101.74, 241/264, 265

See application file for complete search history.

(56) References Cited

U.S. PATENT DOCUMENTS 4,272,032 A * 6/1981 Hellberg ....................... 241/263
4,934,611 A 6/1990 Lewis
6,354,524 B1 * 3/2002 Nakayama et al. ............. 241/34
6,588,691 B2 * 7/2003 Yamamoto et al. ...... 241/101.74
6,811,300 B2 * 11/2004 Kamoshida et al. .......... 366/132
7,124,971 B2 * 10/2006 Sugimura et al. ............. 241/269
7,806,353 B2 10/2010 Douglas et al.
2004/0129815 A1 * 7/2004 Togashi et al. ................ 241/268
2004/0155128 A1 8/2004 Ikegami et al.
2004/0200914 A1 * 10/2004 Hishiyama et al. ...... 241/101.74
2005/0061900 A1 * 3/2005 Okuya .......................... 241/264
2006/0097095 A1 * 5/2006 Boast ............................ 241/264
2006/0144974 A1 7/2006 Umeda et al.
2006/0202075 A1 * 9/2006 Young et al. .................. 241/264
2008/0116307 A1 * 5/2008 Young et al. .................. 241/264

(Continued)

FOREIGN PATENT DOCUMENTS

JP 5-184968 A 7/1993

(Continued)

OTHER PUBLICATIONS

Yamaguchi et al., "Self-Traveling Crusher", U.S. Appl. No. 12/472,543, filed May 27, 2009.

*Primary Examiner* — Bena Miller

(74) *Attorney, Agent, or Firm* — Holtz, Holtz, Goodman & Chick, P.C.

(57) ABSTRACT

A mobile crusher includes: a crusher having a fixed jaw and a swing jaw and adjusting an outlet gap between lower ends of the fixed jaw and the swing jaw, the crusher crushing raw materials by swing movement of the swing jaw toward the fixed jaw and discharging the raw materials crushed by the crusher from the outlet gap to produce crushed materials; a work implement disposed on an upper stream or a lower stream of the crusher to produce the crushed materials; and a controller that controls a work implement speed of the work implement depending on the outlet gap.

8 Claims, 7 Drawing Sheets

U.S. PATENT DOCUMENTS

2009/0294560 A1 12/2009 Yamaguchi et al.

FOREIGN PATENT DOCUMENTS

| | | | |
|---|---|---|---|
| JP | 11-10023 | A | 1/1999 |
| JP | 11-226446 | A | 8/1999 |
| JP | 2000-136739 | A | 5/2000 |
| JP | 2000-317339 | A | 11/2000 |
| JP | 2004-73957 | A | 3/2004 |
| JP | 2004-188251 | A | 7/2004 |
| JP | 2005-270847 | A | 10/2005 |
| JP | 2007-50383 | A | 3/2007 |
| JP | 2007-245035 | A | 9/2007 |

* cited by examiner

MOBILE CRUSHER

BACKGROUND OF THE INVENTION

1. Field of the Invention

The present invention relates to a mobile crusher.

2. Description of Related Art

In a typical mobile crusher including a crusher for crushing raw materials, the raw materials conveyed by a feeder are crushed to a predetermined particle size and the crushed materials are discharged by a conveyor as products (For example, Document 1: JP-A-11-10023). When a jaw crusher is used, the particle size of the crushed materials is determined by adjusting an outlet gap (from which the crushed materials are discharged out of the crusher) between a lower end of a swing jaw and a lower end of a fixed jaw. At this time, the particle size of the crushed materials is increased when the outlet gap is enlarged. Thus, an operating quantity (a crushing throughput per hour) of the crusher for crushing raw materials is usually increased. Conversely, when the outlet gap is shrunk, the particle size of the crushed materials is decreased and thus the operating quantity of the crusher is usually decreased.

However, in the typical mobile crusher, the delivery speed of the feeder and conveyor for delivering raw materials and crushed materials kept constant at the speed for delivering the crushed materials having a large particle size even though the operating quantity of the crusher is varied depending on the particle size of the crushed materials (that is to say, an opening degree of the outlet gap). Thus, the delivery speed is too fast when the crushed materials having a small particle size is delivered, so that conveying efficiency is lowered and energy loss is increased.

SUMMARY OF THE INVENTION

An object of the invention is to provide a mobile crusher capable of reducing energy loss and fuel consumption when a crushing throughput is small.

In order to achieve the object of the invention, a mobile crusher according to an aspect of the invention includes: a crusher comprising a fixed jaw, a swing jaw, and a gap between lower ends of the fixed jaw and the swing jaw being adjustable, the crusher crushing raw materials by swing movement of the swing jaw toward the fixed jaw and discharging the raw materials crushed by the crusher from the gap to produce crushed materials; a work implement disposed on an upper stream or a lower stream of the crusher to produce the crushed materials; and a controller that controls a work implement speed of the work implement depending on the gap.

Since the controller that controls the work implement speed is provided, the speed of the work implement can be controlled by the controller depending on the opening degree of the gap (outlet gap) between the lower ends of the fixed jaw and swing jaw of the crusher. The particle size of the crushed materials depends on the opening degree of the outlet gap and the operating quantity depends on the particle size of the crushed materials. Accordingly, the work implement can be decelerated when the operating quantity of the crusher that crushes the raw materials is small. Thus, energy loss from the work implement can be reduced and therefore fuel consumption can be reduced.

DETAILED DESCRIPTION OF PREFERRED EMBODIMENT(S)

First Exemplary Embodiment

A first exemplary embodiment of the invention will be described below with reference to the attached drawings.

Figure 1:
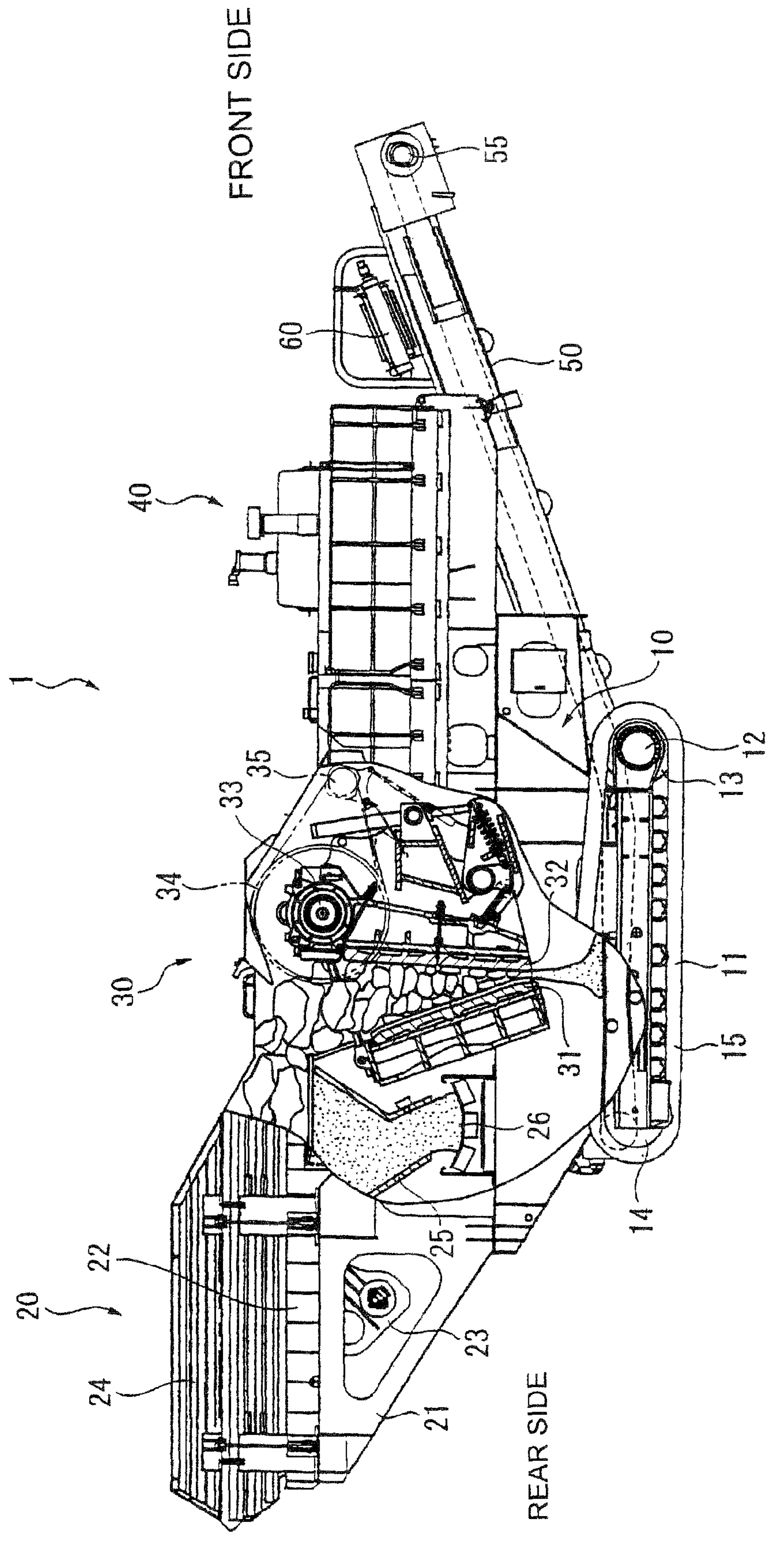
FIG. 1 is a side view of a mobile crusher according to a first exemplary embodiment of the invention.

FIG. 1 is a side view showing a mobile crusher 1 according to the first exemplary embodiment. The mobile crusher 1 crushes raw materials loaded by a loader such as a hydraulic excavator and a wheel loader to produce crushed materials having a predetermined particle size.

The mobile crusher 1 includes: a main unit 10 having a pair of undercarriage members 11 (one of which is shown); a feed unit 20 provided to the rear side on top of the main unit 10 (on the left side in FIG. 1) for supplying raw materials; a crusher 30 provided to the front side of the feed unit 20 (on the right side in FIG. 1); a power unit 40 provided to the front side of the crusher 30; a discharge conveyor 50 (work implement) extending forward and obliquely upward between a pair of crawlers 15 on a lower portion of the main unit 10; and a controller 70 for controlling the discharge conveyor 50 and other work implements.

The main unit 10 includes the undercarriage members 11 on the lower portion. The undercarriage members 11 each include the crawler 15 that is wound around a front sprocket wheel 13 driven by a hydraulic motor 12 and a rear idler tumbler 14.

In the feed unit 20, a grizzly feeder 22 (work implement) is mounted via a plurality of springs (not shown) on the upper side of right and left side frames 21 protruding rearward. The grizzly feeder 22 is driven by a vibrator 23. A hopper 24 is provided on the upper side of the grizzly feeder 22, covering the grizzly feeder 22 from its three sides. Raw materials are thrown into the hopper 24 of which an opening widens upward. A muck shooter 25 is provided on the lower side of the grizzly feeder 22. The muck shooter 25 delivers to a muck conveyor 26 (work implement) uncrushed materials dropped into the muck shooter 25 after being selected by the grizzly feeder 22.

The crusher 30 is a jaw crusher including a fixed jaw 31 and a swing jaw 32. When a pulley 34 provided on an end of a main shaft 33 is driven by a hydraulic motor 35 via a V-belt, the swing jaw 32 functions as a swinging link by the rotation of the main shaft 33 to crush raw materials between the fixed jaw 31 and the swing jaw 32.

Figure 2:
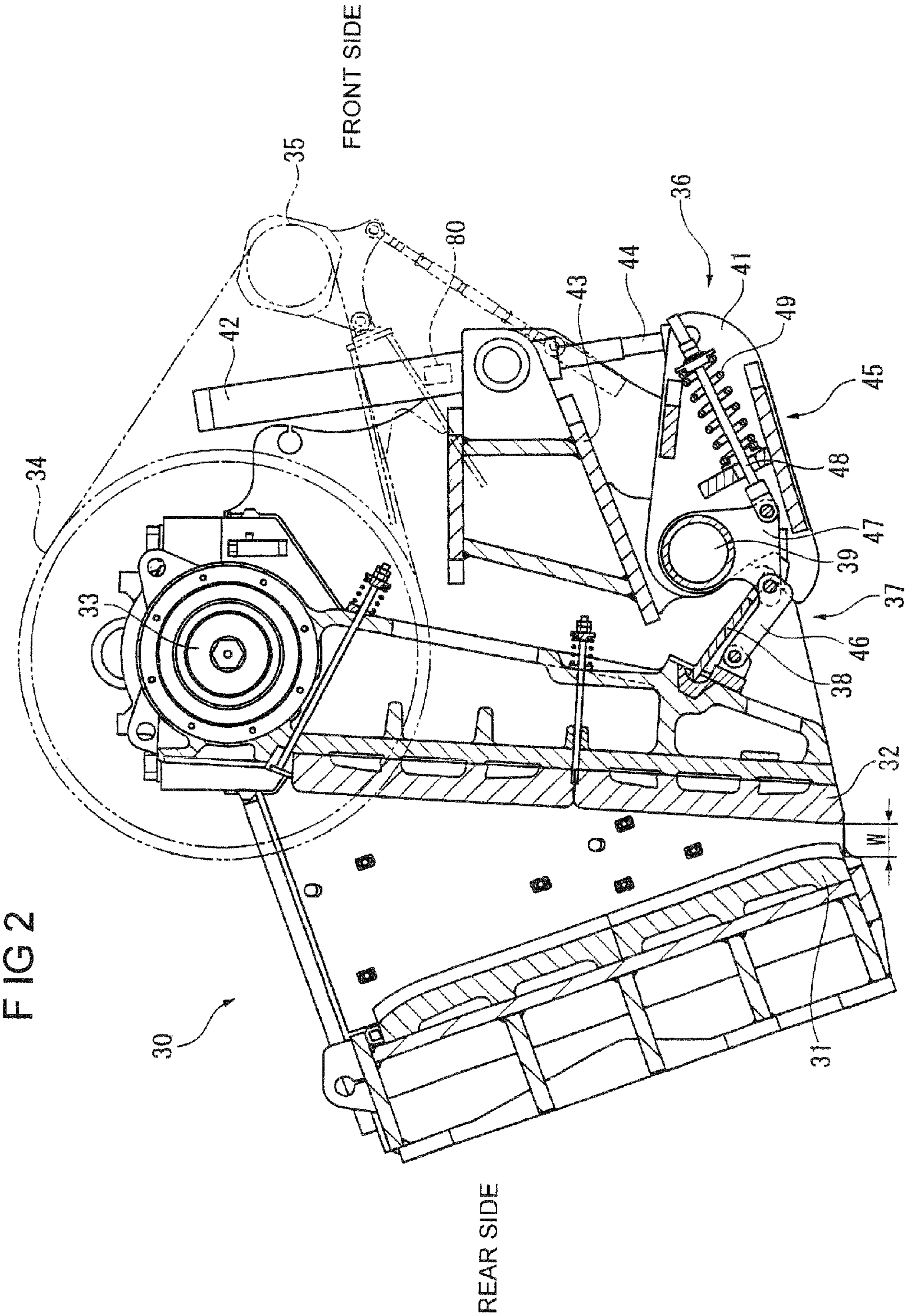
FIG. 2 shows a crusher according to the first exemplary embodiment.

As shown in FIG. 2, a lower portion of the swing jaw 32 is supported by a reaction force-receiving link mechanism 36 for receiving reaction force generated when the raw materials are crushed and is biased constantly toward the reaction force-receiving link mechanism 36 via a tension link mechanism 37.

The reaction force-receiving link mechanism 36 includes: a toggle plate 38 having a first end engaged on a rear portion of the swing jaw 32; a toggle link 41 that supports a second end of the toggle plate 38 and rotates about a fixed link pin 39; and a mechanical lock hydraulic cylinder 42 having a lower end pivoted on the toggle link 41. The mechanical lock hydraulic cylinder 42 is rotatably pivoted on the side closer to the cross member 43 (trunnion structure). The mechanical lock hydraulic cylinder is a hydraulic cylinder for locking a piston or a rod at any position by a shrink fitter. An outlet gap W between the lower ends of the jaws 31 and 32 can be adjusted by advancing and retracting a rod 44 of the mechanical lock hydraulic cylinder 42 via an advancement and retraction driver (not shown). In other words, the reaction force-receiving link mechanism 36 functions as an outlet gap adjusting link mechanism 45 in which the mechanical lock hydraulic cylinder 42 is driven to move the swing jaw 32 toward and away from the fixed jaw 31 via the toggle link 41 and the toggle plate 38.

The tension link mechanism 37 is disposed substantially in the center of the reaction force-receiving link mechanism 36. The tension link mechanism 37 includes: a tension link 46 having an end pivoted on the side closer to the swing jaw 32; a tension lever 47 rotatably pivoted on the fixed pin 39; a tension rod 48 having an end pivoted on the tension lever 47; and a tension spring 49 biasing the tension rod 48 in a predetermined direction. The tension rod 48 and tension spring 49 are attached to the toggle link 41.

A potentiometer 80 is attached to the mechanical lock hydraulic cylinder 42. The potentiometer 80 detects a rotation angle θ of the mechanical lock hydraulic cylinder 42 that turns in accordance with an advancement and retraction amount of the rod 44, and outputs a detection signal to the controller 70.

Figure 3:
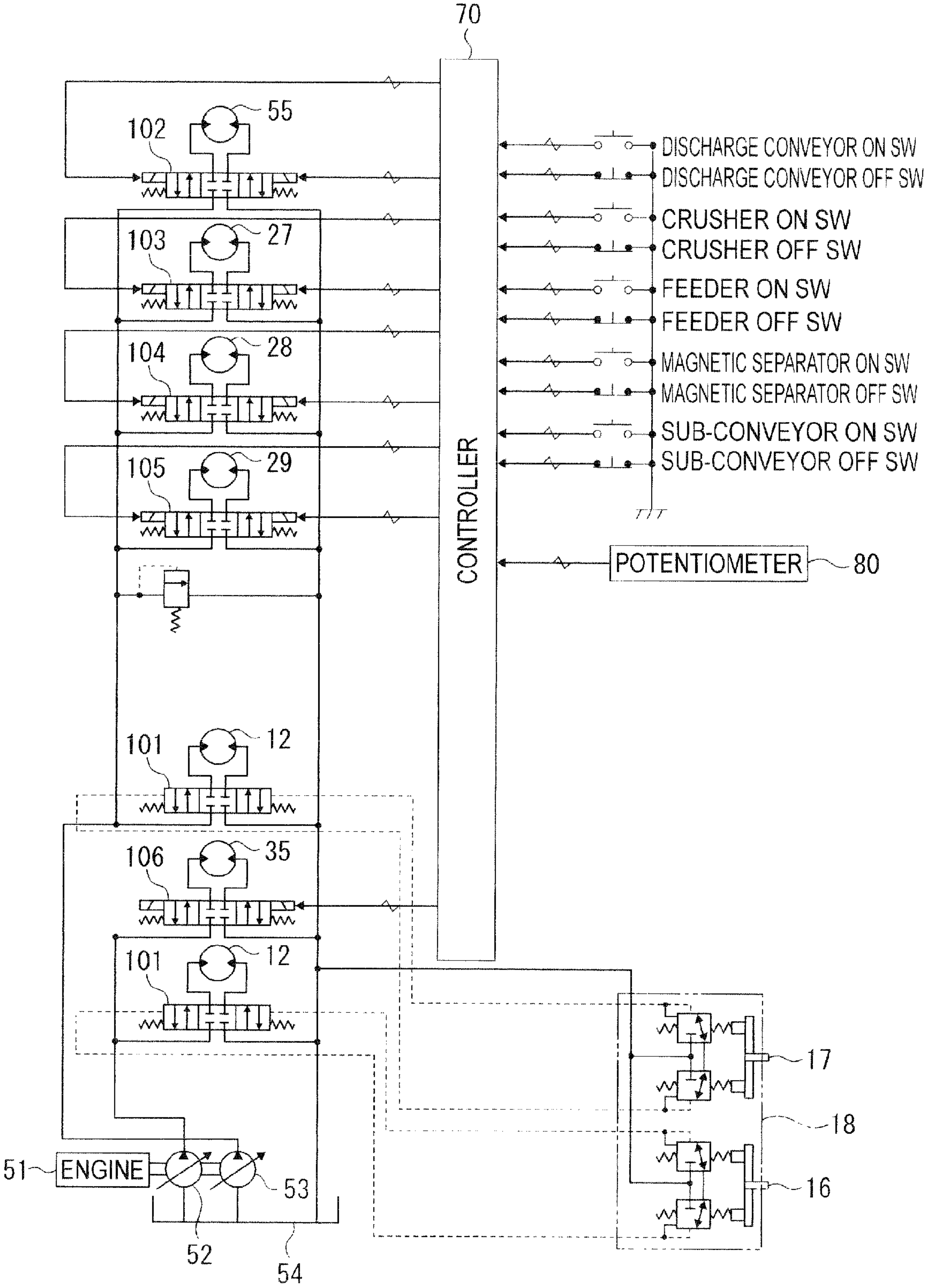
FIG. 3 shows a hydraulic circuit of the mobile crusher.

Referring to a hydraulic circuit of the mobile crusher 1 as shown in FIG. 3, the power unit 40 includes an engine 51, variable displacement hydraulic pumps 52 and 53 driven by the engine 51, a fuel tank, and a hydraulic oil tank 54. Hydraulic pressure from the hydraulic pump 52 is supplied to the hydraulic motor 12 of the undercarriage members 11 and the hydraulic motor 35 of the crusher 30 through control valves 101 and 106 while being supplied to the control valve 101 as pilot pressure through a direction switching device 18 provided on a right travel lever 16.

On the other hand, hydraulic pressure from the hydraulic pump 53 is supplied to the hydraulic motor 12 of the undercarriage members 11, a hydraulic motor 55 of the discharge conveyor 50, a hydraulic motor 27 of the vibrator 23 provided on the grizzly feeder 22, a hydraulic motor 28 of a magnetic separator 60, and a hydraulic motor 29 of the muck conveyor 26 through the control valves 101 to 105 while being supplied to the control valve 101 as pilot pressure through the direction switching device 18 provided on a left travel lever 17. Electrical signals from ON-OFF switches of the grizzly feeder 22, muck conveyor 26, crusher 30, discharge conveyor 50 and magnetic separator 60 and a detection signal from the potentiometer 80 are inputted to the controller 70.

The discharge conveyor 50 includes the hydraulic motor 55 on the front side. The discharge conveyor 50 discharges forward and drops from a height crushed materials, which are dropped from the outlet of the crusher 30, to accumulate the dropped crushed materials. When raw materials contain foreign substances such as reinforcing steel bars and metal chips, the magnetic separator 60 (work implement) may be mounted on the front side of the discharge conveyor 50 to remove the foreign substances.

In other words, the grizzly feeder 22 and muck conveyor 26 are disposed on an upper stream of the crusher 30, and the discharge conveyor 50 and magnetic separator 60 are disposed on a lower stream of the crusher 30.

Figure 4:
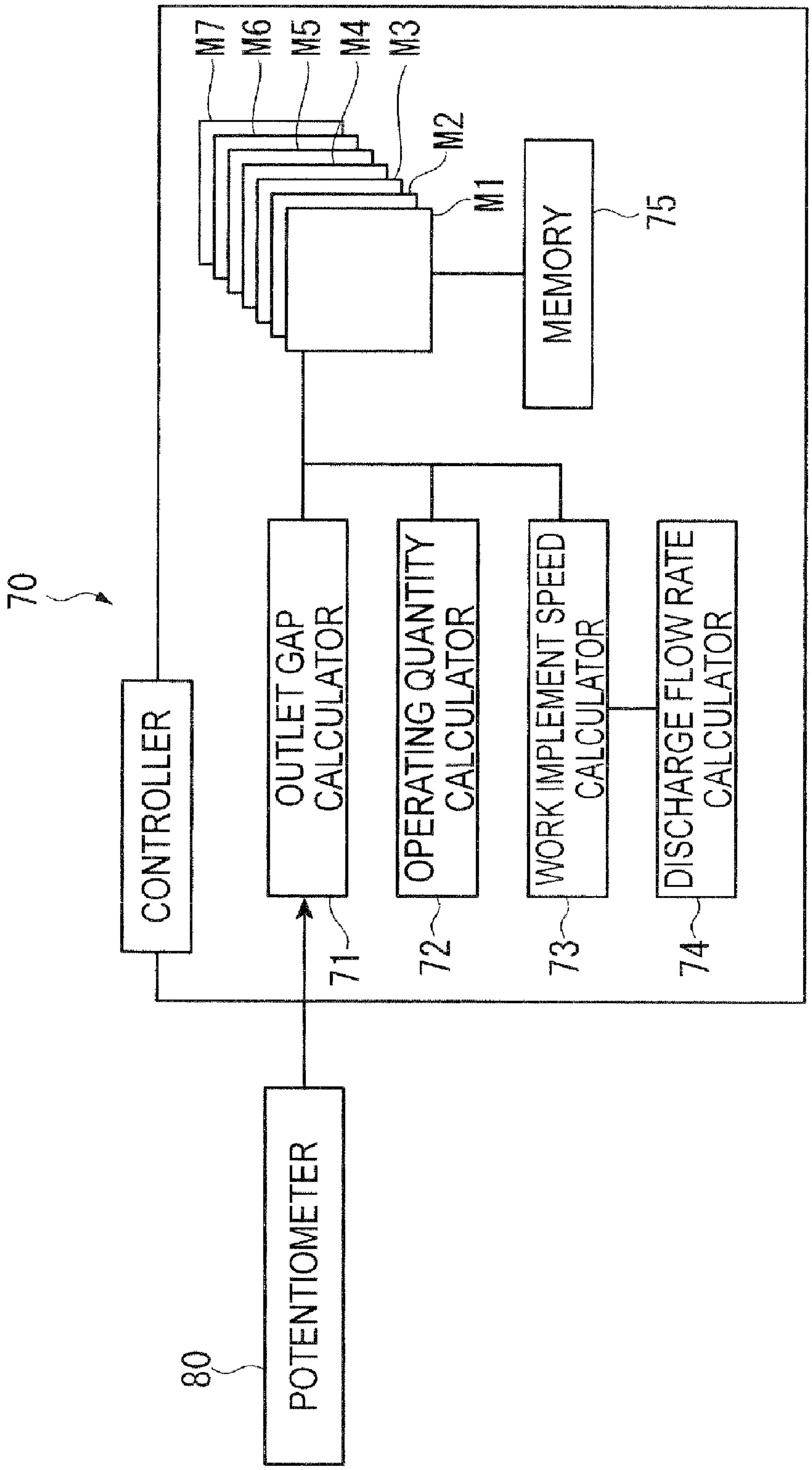
FIG. 4 is a block diagram according to the first exemplary embodiment.

Referring to a block diagram of the controller 70 in FIG. 4, the controller 70 is equipped with a CPU (Central Processing Unit). The controller 70 includes an outlet gap calculator 71, an operating quantity calculator 72, a work implement speed calculator 73, a discharge flow rate calculator 74 and a memory 75, which are provided by software such as a computer program.

The memory 75 stores: a map $M_1$ that is a data table of the outlet gap W in accordance with the rotation angle θ of the mechanical lock hydraulic cylinder 42 detected by the potentiometer 80; a map $M_2$ that is a data table of an operating quantity D (crushing throughput per hour) of the crusher 30 in accordance with the outlet gap W; a map $M_3$ that is a data table of a speed $V_1$ of the discharge conveyor 50 in accordance with the operating quantity D; a map $M_4$ that is a data table of a speed $V_2$ of the grizzly feeder 22 in accordance with the operating quantity D; a map $M_5$ that is a data table of a speed $V_3$ of the muck conveyor 26 in accordance with the operating quantity D; a map $M_6$ that is a data table of a speed $V_4$ of the magnetic separator 60 in accordance with the operating quantity D; and a map $M_7$ that is a data table of a discharge flow rate Q of the hydraulic pump 53 in accordance with the speeds $V_1$ to $V_4$ of the work implements. The work implement speeds $V_1$ to $V_4$ stored in the maps are the minimum speed for conveying and crushing raw materials and conveying the crushed materials. At a slower speed than the minimum speed, the raw materials and crushed materials are accumulated in any one of the work implements 22, 26, 50 and 60, which may impair the operation.

Figure 5:
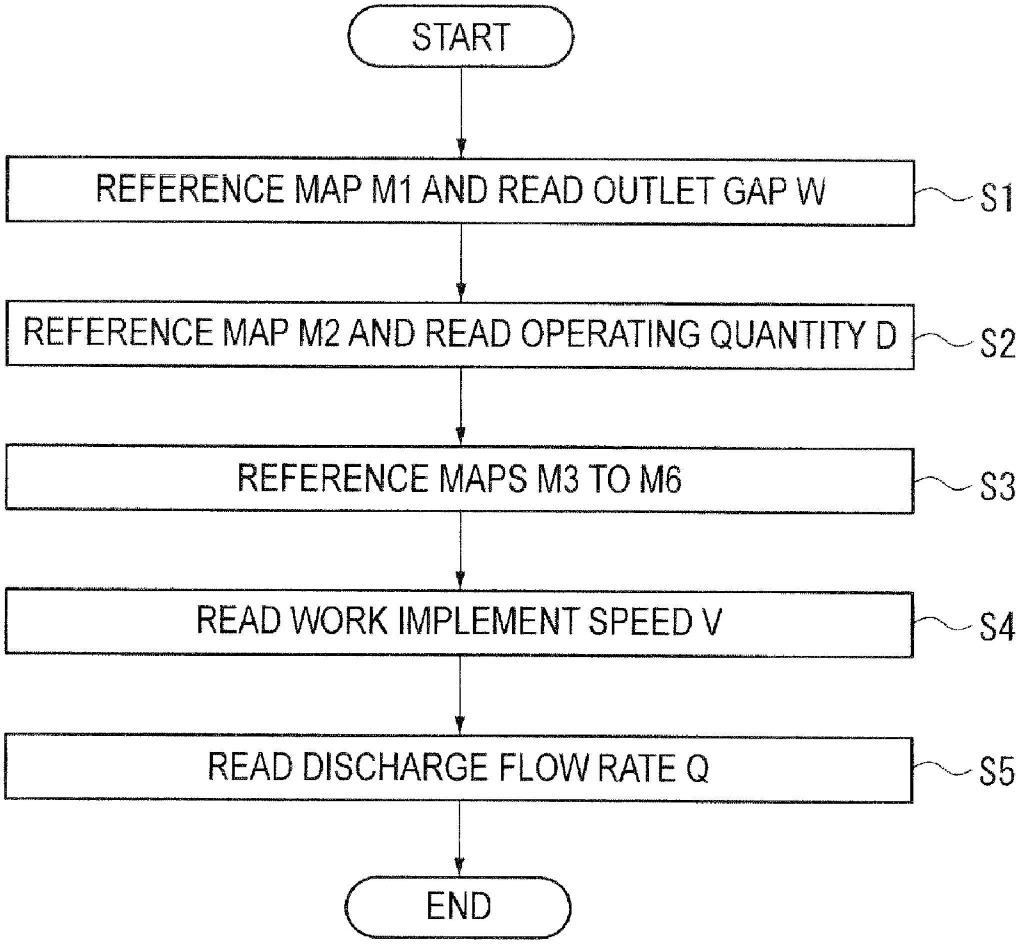
FIG. 5 is a flow chart according to the first exemplary embodiment.

Next, functions of the calculators 71 to 74 will be described below with reference to a flow chart shown in FIG. 5. The flow chart in FIG. 5 shows a flow for controlling the work implement speeds $V_1$ to $V_4$ of the work implements 22, 26, 50 and 60 of the mobile crusher 1 depending on the operating quantity D.

Before crushing, an operator initially gets the crusher 30 running and manipulates the advancement and retraction driver (not shown) of the mechanical lock hydraulic cylinder 42 to properly change the outlet gap W, so that raw materials are crushed to a desired particle size. When a jaw crusher is used, a particle size of crushed materials is in proportion to an opening degree of the outlet gap W. After confirming that raw materials are crushed to the desired size, the operator starts crushing operation in a continuously-operated mode or the like. When a signal indicating operation start is inputted to the controller 70, the outlet gap calculator 71 of the controller 70 detects a rotation angle θ of the mechanical lock hydraulic cylinder 42 using the potentiometer 80 and references the map $M_1$ stored in the memory 75 to read the predetermined outlet gap W (S1).

Then, the operating quantity calculator 72 references the map $M_2$ stored in the memory 75 to read an operating quantity D of the crusher 30 in accordance with the outlet gap W calculated by the outlet gap calculator 71 (S2). The work implement speed calculator 73 references the maps $M_3$ to $M_6$ (S3), and reads the work implement speeds $V_1$ to $V_4$ of the work implements 22, 26, 50 and 60 in accordance with the operating quantity D (S4). Then, the discharge flow rate calculator 74 references the map $M_7$ to read a discharge flow rate Q of the hydraulic pump 53 in accordance with the work implement speeds $V_1$ to $V_4$, and outputs to the hydraulic pump 53 a drive command in accordance with the discharge flow rate Q to change an angle of swash plates (S5). Thus, the work implements 22, 26, 50 and 60 are driven at the work implement speeds $V_1$ to $V_4$, respectively.

Since the controller 70 includes the work implement speed calculator 73 in this exemplary embodiment, the work implement speeds $V_1$ to $V_4$ of the work implements 22, 26, 50 and 60 can be calculated in accordance with the outlet gap W calculated from the angle θ of the potentiometer 80. Accordingly, the work implement speeds $V_1$ to $V_4$ can be controlled in accordance with the operating quantity D even when the operating quantity D is varied depending on a particle size of crushed materials. When the particle size is small and the outlet gap W is also small, the work implement speeds $V_1$ to $V_4$ can be slowed down. Thus energy loss can be reduced and therefore fuel consumption can be reliably reduced.

Second Exemplary Embodiment

Figure 6:
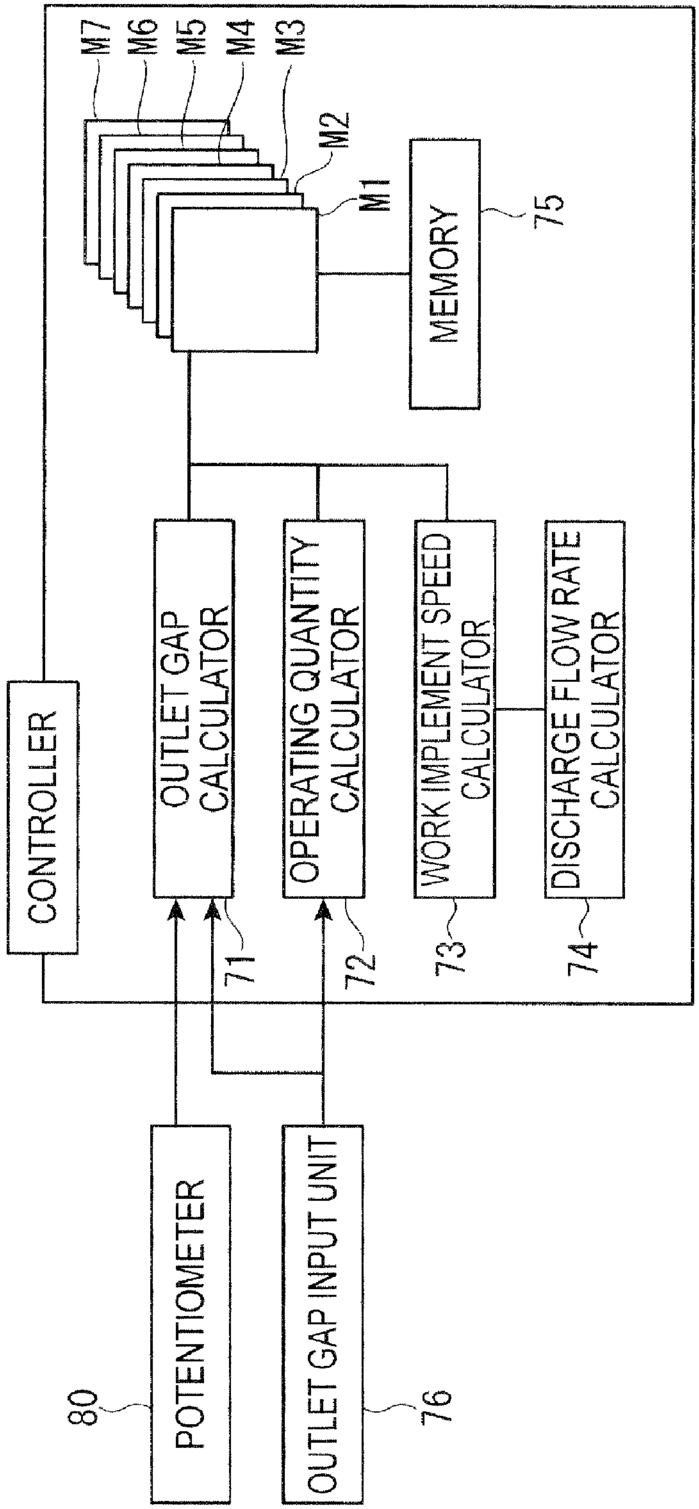
FIG. 6 is a block diagram according to a second exemplary embodiment of the invention.
Figure 7:
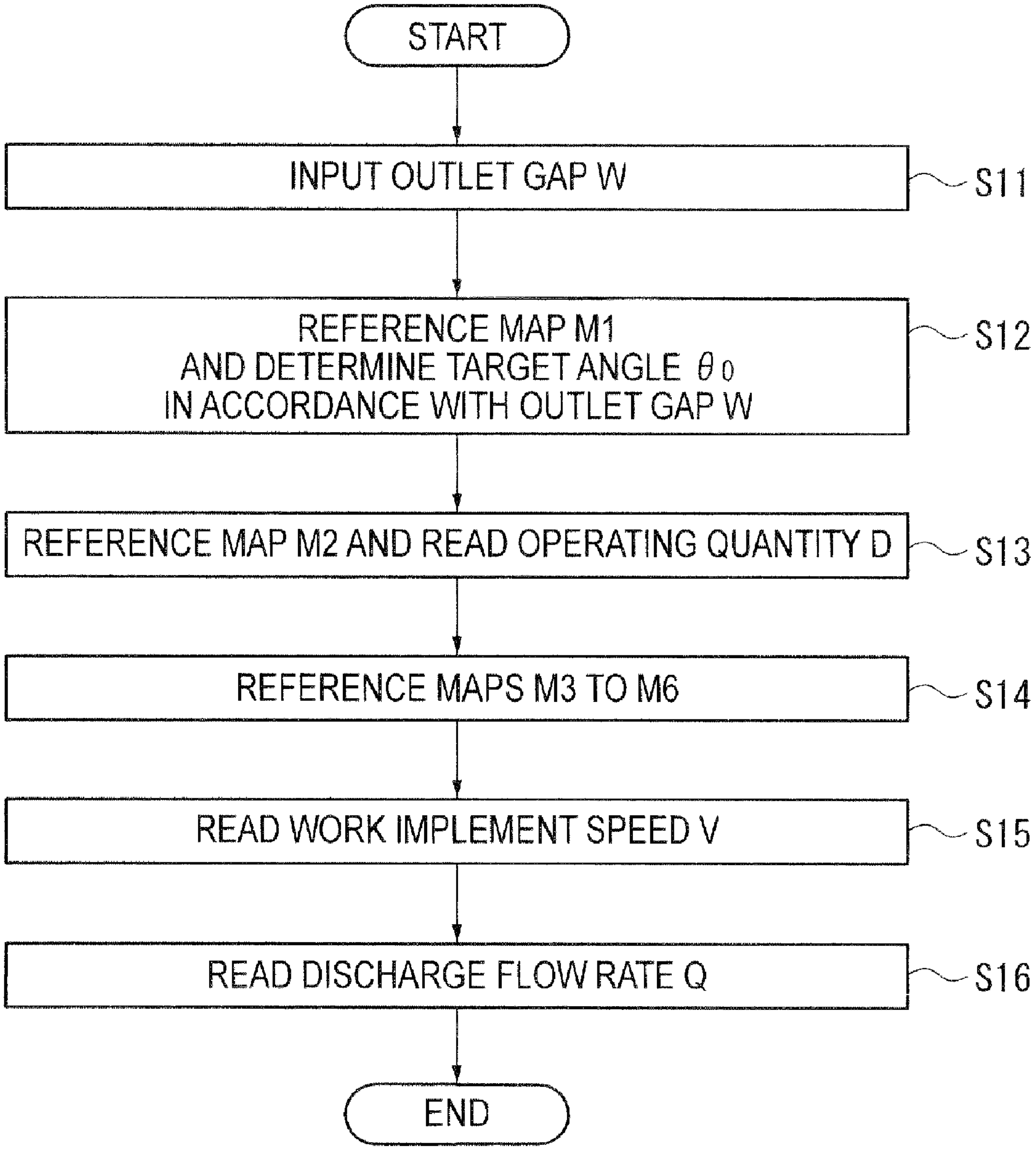
FIG. 7 is a flow chart according to the second exemplary embodiment.

FIG. 6 is a block diagram of the controller 70 and FIG. 7 is a flow chart of the controller 70 according to a second exemplary embodiment. In the second exemplary embodiment, an outlet gap input unit 76 such as an operation panel is connected to the controller 70. A desired outlet gap W is inputted to the outlet gap input unit 76. The controller 70 controls an advancement and retraction amount of the mechanical lock hydraulic cylinder 42 to provide the outlet gap W inputted to the outlet gap input unit 76.

In the second exemplary embodiment, an operator initially inputs a desired outlet gap W to the outlet gap input unit 76 (S1). Then, the outlet gap calculator 71 of the controller 70 references the map $M_1$, reads a rotation angle θ in accordance with the inputted outlet gap W to provide a target angle $\theta_0$, and outputs a drive command to the advancement and retraction driver of the mechanical lock hydraulic cylinder 42 so that the rotation angle θ of the mechanical lock hydraulic cylinder 42 becomes the target angle $\theta_0$ (S12). The operating quantity calculator 72 references the map $M_2$ and reads an operating quantity D of the crusher 30 in accordance with the outlet gap W inputted to the outlet gap input unit 76 (S13). S14 to S16 are the same as S3 to S5 shown in FIG. 5 according to the first exemplary embodiment, and the description thereof will be omitted.

In the second exemplary embodiment, the outlet gap W can be automatically adjusted by feedback control of the rotation angle θ while the work implement speeds $V_1$ to $V_4$ can be calculated simply by inputting a desired outlet gap W to the outlet gap input unit 76. Similarly to the first exemplary embodiment, the work implement speeds $V_1$ to $V_4$ can be slowed down when the outlet gap W is small. Thus, energy loss can be reduced.

The best arrangements, methods and the like for carrying out the invention are disclosed above, but the invention is not limited thereto. In other words, while the invention is particularly explained and illustrated mainly in relation to specific embodiments, a person skilled in the art could make various modifications in terms of shape, amount or other particulars to the above-described embodiments without departing from the spirit and scope of the invention.

Therefore, because the above-disclosed description limiting the shape, amount and the like is merely an exemplified statement for facilitating understanding of the invention and is not a limitation on the invention, a statement using names of the members on which a part of or all of the limitations regarding the shape, amount and the like is eliminated is included in the invention.

For example, in the exemplary embodiments, the operating quantity D is calculated in accordance with the outlet gap W, the work implement speeds $V_1$ to $V_4$ are calculated in accordance with the operating quantity D, and then the discharge low rate Q is calculated in accordance with the work implement speeds $V_1$ to $V_4$ using the maps $M_2$ to $M_7$. However, a map for calculating the discharge flow rate Q directly from the outlet gap W (or directly from the particle size) may be used to simplify the control process.

Though the jaw crusher is used as the crusher 30 in the exemplary embodiments, other crusher such as an impact crusher may be used.

Though the grizzly feeder 22, muck conveyor 26, discharge conveyor 50 and magnetic separator 60 are provided as the work implements in the exemplary embodiments, it is only required that at least one of the work implements is provided. It is not required that all of the above-described work implements are provided.

A driving source of the work implements may be an electromotor. At this time, a rotational speed of the electromotor is regarded as the work implement speed.

Though the outlet gap input unit 76 to which a desired outlet gap W is inputted is used in the second exemplary embodiment, an input unit to which a particle size of crushed materials is inputted may be used.

Though the operating quantity of the crusher is calculated from the outlet gap of the crusher in accordance with the particle size of crushed materials in the first and second exemplary embodiments, the operating quantity may be calculated from hydraulic oil pressure of the hydraulic motor that drives the grizzly feeder that feeds the crushed materials to the crusher.

The entire disclosure of Japanese Patent Application No. 2008-127048, filed May 14, 2008, and No. 2009-078911, filed Mar. 27, 2009, are expressly incorporated by reference herein.

What is claimed is:

1. A mobile crusher comprising:

a crusher comprising a fixed jaw and a swing jaw, wherein a gap between lower ends of the fixed jaw and the swing jaw is adjustable, and wherein the crusher crushes raw materials by swing movement of the swing jaw toward the fixed jaw and discharges the raw materials crushed by the crusher from the gap to produce crushed materials;

a work implement which is disposed on an upstream side or a downstream side of the crusher, and which operates with the crusher to produce the crushed materials; and a controller that controls a work implement speed of the work implement depending on the gap;

wherein the controller controls the work implement speed to be decelerated when the gap becomes small.

2. The mobile crusher according to claim 1, wherein the work implement is driven by a hydraulic motor, and the work implement speed of the work implement is a rotational speed of the hydraulic motor.

3. The mobile crusher according to claim 2, wherein the work implement comprises a discharge conveyor that conveys the crushed materials.

4. The mobile crusher according to claim 2, wherein the work implement comprises a magnetic separator provided on a discharge conveyor that conveys the crushed materials.

5. The mobile crusher according to claim 2, wherein the work implement comprises a feeder that conveys the raw materials to the crusher.

6. The mobile crusher according to claim 5, wherein the work implement comprises a sub-conveyor that coveys the raw materials that are uncrushed and selected by the feeder.

7. The mobile crusher according to claim 1, wherein the controller comprises:

a gap calculator which reads the gap;

an operating quantity calculator which reads an operating quantity of the crusher in accordance with the gap calculated by the gap calculator; and a work implement speed calculator which reads the work implement speed of the work implement in accordance with the operating quantity read by the operating quantity calculator.

8. The mobile crusher according to claim 1, further comprising:

a hydraulic cylinder which is advancable and retractable to adjust the gap; and a gap input unit for receiving an input of a desired gap; wherein the controller comprises:

a gap calculator that outputs a drive command to an advancement and retraction driver of the hydraulic cylinder in accordance with the gap inputted to the gap input unit;

an operating quantity calculator that reads an operating quantity of the crusher in accordance with the gap inputted to the gap input unit; and a work implement speed calculator which reads the work implement speed of the work implement in accordance with the operating quantity read by the operating quantity calculator.

* * * * *